United States Patent
Wang et al.

(10) Patent No.: US 7,781,530 B2
(45) Date of Patent: Aug. 24, 2010

(54) POLYMERIC COMPOSITIONS INCLUDING THEIR USES AND METHODS OF PRODUCTION

(75) Inventors: Hsien-Chang Wang, Bellaire, TX (US); Wai Keung Wong, Wezembeek-Oppem (BE); Srivatsan Srinivas Iyer, Pearland, TX (US); Pascal Van Hoeck, Kapelle-op-den-Bos (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 708 days.

(21) Appl. No.: 11/332,802

(22) Filed: Jan. 13, 2006

(65) Prior Publication Data

US 2006/0183862 A1    Aug. 17, 2006

Related U.S. Application Data

(60) Provisional application No. 60/648,930, filed on Jan. 31, 2005, provisional application No. 60/729,971, filed on Oct. 24, 2005.

(51) Int. Cl.
| | |
|---|---|
| *B65D 39/00* | (2006.01) |
| *B32B 27/08* | (2006.01) |
| *B29D 22/00* | (2006.01) |
| *C08L 9/00* | (2006.01) |
| *C08L 47/00* | (2006.01) |
| *C08L 23/00* | (2006.01) |

(52) U.S. Cl. .......... 525/240; 428/35.7; 428/36.8; 525/191; 525/232; 525/235; 525/241; 525/211

(58) Field of Classification Search .......... 525/191, 525/232, 235, 240, 241, 211; 428/35.7, 36.8
See application file for complete search history.

(56) References Cited

U.S. PATENT DOCUMENTS

| | | | | |
|---|---|---|---|---|
| 3,311,151 | A | * | 3/1967 | Willis et. al. ............. 152/209.1 |
| 4,616,052 | A | * | 10/1986 | Habibullah ................. 524/104 |
| 5,051,477 | A | * | 9/1991 | Yu et al. .................... 525/194 |
| 5,737,469 | A | * | 4/1998 | Costello et al. ............. 385/109 |
| 5,986,009 | A | * | 11/1999 | Thoen et al. ................ 525/232 |
| 6,288,171 | B2 | * | 9/2001 | Finerman et al. ........... 525/192 |
| 6,326,433 | B1 | * | 12/2001 | Wang et al. ................. 525/191 |
| 6,605,695 | B2 | * | 8/2003 | Takasaki et al. ............... 528/2 |
| 6,875,813 | B2 | * | 4/2005 | Tsou et al. .................. 525/191 |
| 7,339,018 | B2 | * | 3/2008 | Arjunan .................... 526/336 |
| 7,344,766 | B1 | * | 3/2008 | Sorensen et al. ........... 428/35.7 |
| 2004/0053067 | A1 | * | 3/2004 | Dharmarajan et al. ....... 428/521 |
| 2004/0054040 | A1 | * | 3/2004 | Lin et al. ..................... 524/62 |
| 2004/0106723 | A1 | * | 6/2004 | Yang et al. .................. 524/570 |
| 2004/0249085 | A1 | * | 12/2004 | Waddell et al. .......... 525/333.3 |
| 2004/0260001 | A1 | * | 12/2004 | Lin et al. .................... 524/474 |

FOREIGN PATENT DOCUMENTS

| | | |
|---|---|---|
| EP | 0 536 503 | 4/1993 |
| JP | 52142753 | 11/1977 |
| WO | WO 02/051928 | 7/2002 |
| WO | 02/083754 | 10/2002 |
| WO | 2005/049670 | 6/2005 |

OTHER PUBLICATIONS

"ExxonMobil Basestocks_SHF", 2002.*
Ohm, R. F., Ed., "Non-tire Applications—*Pharmaceutical Closures*." in: *The Vanderbilt Rubber Handbook* (Thirteenth Edition, R. T. Vanderbilt Company, Inc., Connecticut, 1990), pp. 120-121.

* cited by examiner

*Primary Examiner*—Vasu Jagannathan
*Assistant Examiner*—Irina Krylova

(57) ABSTRACT

Polymeric compositions and methods of making and using such compositions are provided. The compositions incorporate a first component that is an isobutylene-based polymer and a second component having propylene-derived units and polyene derived units. The polymeric compositions have desirable processability characteristics, particularly for injection molding applications.

20 Claims, No Drawings

POLYMERIC COMPOSITIONS INCLUDING THEIR USES AND METHODS OF PRODUCTION

CROSS REFERENCE TO RELATED APPLICATIONS

This application claims the benefit of Provisional Application Nos. 60/648,930 filed Jan. 31, 2005 and 60/729,971, filed Oct. 24, 2005, the disclosures of which are incorporated by reference.

FIELD OF THE DISCLOSURE

The disclosure relates to polymeric compositions and methods of making and using such compositions. The compositions incorporate at least one polymeric component including propylene-derived units and at least one polymeric component incorporating an isobutylene-based polymer. Optionally, the propylene-derived units can contain a polyene-derived unit, as for example a diene-derived unit.

BACKGROUND INFORMATION

Isobutylene-based polymers, particularly halogenated isobutylene-based polymers such as brominated butyl rubber are the primary compositions of most tire liners, heat resistant tubes, bladders and other commercial products such as pharmaceutical ware, for example stoppers. Compounds based on butyl polymers are commonly used in a wide variety of applications, and both injection and compression moulding processes may be employed.

U.S. Pat. No. 6,326,433 discloses barrier membranes made from polymeric compositions comprising an isobutylene-based polymer and a semi-crystalline polymer wherein the semi-crystalline polymer has a melting point from about 25° C. to about 105° C. and a heat of fusion from about 9 J/g to about 50 J/g as determined by DSC. The compositions contain at least 15 parts by weight of the semi-crystalline polymer and 10 parts of Flexon, a non-volatile fluid. Column 1, line 28 discloses that isobutylene-based polymers may be used to fabricate molded items such as "pharmaceutical stoppers".

SUMMARY OF THE DISCLOSURE

This disclosure relates to polymeric compositions and methods of making and using such compositions. The compositions incorporate at least one component that is an isobutylene-based polymer and at least one component that is a polymer incorporating propylene-derived units. The polymers incorporating propylene-derived units have a heat of fusion of less than 75 J/g and the propylene-derived units have an isotactic triad fraction of about 65% to about 99%. The heat of fusion and isotactic triad fraction of a polymer, as well as methods for the determination of each, are described in WO 2002/083754 A1, which is incorporated herein by reference in its entirety.

The polymeric compositions are found to have physical properties that are useful and desirable for inclusion in a variety of products, including injection molded pharmaceutical stoppers. In particular, in one embodiment, the polymeric compositions exhibit improved processability characteristics as exhibited by increased injection molding throughput at lower injection molding pressures.

The polymeric compositions described herein are useful for producing molded articles at high processing speeds. Moreover, the polymeric compositions described herein are capable of providing processability benefits without sacrificing physical properties of articles produced from the polymeric compositions.

As a further embodiment, any of the polymeric compositions disclosed herein may further include a polymer incorporating propylene-derived units that further comprises polyene-derived units, for example, diene-derived units. The invention can further include method of making a composition, comprising contacting a first component with a second component. Also included herein is a method of forming an article, comprising melting a composition to form a melted composition, forming the melting composition into a shape, and cooling the shape to consolidate it into an article.

DETAILED DISCLOSURE

This disclosure relates to polymeric compositions that have processability characteristics enabling the compositions to be used in a variety of product forms, particularly injection molded product forms, while exhibiting beneficial physical properties. For certain product applications, it is desirable to improve the injection-moldability of polymeric compositions in order to increase throughput and reduce scrap. Increasing the loading of process oil to improve processability would have a detrimental effect on physical, mechanical and barrier properties. For example, the polymeric compositions described herein may exhibit one or more improvements as follows a lower viscosity, an improved scorch performance, an increase in hardness and tensile strength, as well as improvements in processability, as compared to conventional isobutylene compositions.

In one embodiment, the polymeric compositions include at least two components. The first component is an isobutylene-based polymer and the second component is a polymer including propylene-derived units. The polymer including propylene-derived units has a heat of fusion of less than 75 J/g and wherein the propylene-derived units have an isotactic triad fraction of about 65% to about 99%. In one embodiment, the polymeric compositions incorporate 100 parts by weight of the isobutylene-based polymer and from about 2 parts by weight to about 12 parts by weight of the polymer including propylene-derived units, more preferably about 2 parts by weight to about 10 parts by weight of the polymer including propylene-derived units, and more preferably, from about 5 parts by weight to about 10 parts by weight of the polymer including propylene-derived units.

In one embodiment, compositions having the aforementioned improvements comprise an isobutylene based polymer and a polymer comprising both a propylene-derived unit and a polyene derived unit. Optionally, the isobutylene based polymer may comprise a butyl-rubber based compound. Optionally, the polyene derived unit may comprise a diene derived unit.

In one embodiment, the polymeric compositions include at least two components. The first component is an isobutylene-based polymer and the second component is a polymer including propylene-derived units and polyene derived units. The polymer including propylene-derived units has a heat of fusion of less than 75 J/g and the propylene-derived units have an isotactic triad fraction of about 65% to about 99%. In one embodiment, the polymeric compositions incorporate 100 parts by weight of the isobutylene-based polymer and from about 0.1 parts by weight to about 40 parts by weight of the second component. In another embodiment, the polymeric compositions incorporate 100 parts by weight of the isobutylene-based polymer and from about 5 parts by weight to about 30 parts by weight of the second component. In still another embodiment, the polymeric compositions incorporate 100 parts by weight of the isobutylene-based polymer and from about 10 parts by weight to about 20 parts by weight of the second component.

In one embodiment, the combined weights of the isobutylene-based polymer and the polymer including propylene-derived units comprise from about 50 wt. % to about 100 wt. % of the polymeric composition. In another embodiment, the combined weights of the isobutylene-based polymer and the polymer including propylene-derived units comprise from about 50 wt. % to about 90 wt. % of the polymeric composition. In still another embodiment, the combined weights of the isobutylene-based polymer and the polymer including propylene-derived units comprise from about 60 wt. % to about 80 wt. % of the polymeric composition.

In other embodiments, the polymeric compositions may also incorporate from about 2 parts by weight to about 10 parts by weight of a non-functionalized plasticizer, based upon 100 parts by weight of the isobutylene-based polymer. In another embodiment, the polymeric compositions may also incorporate from about 5 parts by weight to about 10 parts by weight of a non-functionalized plasticizer, based upon 100 parts by weight of the isobutylene-based polymer. In a third embodiment, the polymeric compositions may incorporate from about 5 parts by weight to about 8 parts by weight of a non-functionalized plasticizer, based upon 100 parts by weight of the isobutylene-based polymer.

In certain embodiments, the combined weights of the isobutylene-based polymer, the polymer including propylene-derived units, and the non-functionalized plasticizer comprise from about 50 wt. % to about 100 wt. % of the polymeric composition. In other embodiments, the combined weights of the isobutylene-based polymer, the polymer including propylene-derived units, and the non-functionalized plasticizer comprise from about 50 wt. % to about 90 wt. % of the polymeric composition. In still other embodiments, the combined weights of the isobutylene-based polymer, the polymer including propylene-derived units, and the non-functionalized plasticizer comprise from about 60 wt. % to about 80 wt. % of the polymeric composition.

In one embodiment, the polymeric compositions described herein have a Shore A hardness of less than about 65. In another embodiment, the polymeric compositions described herein have a Shore A hardness of less than about 30 to about 70. In additional embodiments, the polymeric compositions described herein have a Shore A hardness of about 35 to about 60. In still other embodiments, the polymeric compositions described herein have a Shore A hardness of about 40 to about 55.

In one embodiment, the polymeric compositions described herein have a Mooney Viscosity ML (1+4) 100° C. (ASTM D 1646) of about 50 to about 90. In another embodiment, the polymeric compositions described herein have a Mooney Viscosity ML (1+4) 100° C. of about 55 to about 85. In still another embodiment, the polymeric compositions described herein have a Mooney Viscosity ML (1+4) 100° C. of about 60 to about 80. Low Mooney values usually translate to improved processability, for example, better throughput and lower injection pressures. One common method to reduce the Mooney of the rubber compound is to add low molecular weight plasticizers such as process oils. This approach, however, results in deterioration of physical properties such as tensile strength, compression set, and heat aging. It is therefore desirable to improve the processability of these rubber compounds without negatively affecting physical properties of interest such as tensile strength compression set etc. Furthermore, the use of low molecular weight plasticizer or process oils in certain applications, such as pharmaceutical stoppers, is not desirable as they can migrate and contaminate the stored drugs.

As discussed above, the polymeric compositions described herein exhibit increased injection molding throughput even at lower pressures as compared to conventional isobutylene-based polymer compositions. By the same token, the polymeric compositions described herein will also increase the throughput rate of other processing means, such as extrusion. In certain embodiments, it is observed that inclusion of 10 parts by weight of the polymer including propylene-derived units, based upon 100 parts by weight of the isobutylene-based polymer, increased injection molding throughput, as measured by volume per unit of time, by approximately 10%, while increasing hardness, 100% modulus and tensile strength, without negatively affecting compression set in a manner especially suited for mass produced articles made from the polymeric composition such as pharmaceutical stoppers.

In one embodiment, the polymeric compositions described herein exhibit a 100% modulus value (MPa) of about 1.0 to about 3.0. In another embodiment, the polymeric compositions described herein have a 100% modulus value of about 1.2 to about 2.5. In still another embodiment, the polymeric compositions described herein exhibit a 100% modulus value of about 1.2 to about 2.0.

In certain embodiments, the polymeric compositions described herein exhibit a tensile strength (MPa) of about 3.5 to about 7.0. In another embodiment, the polymeric compositions described herein have a tensile strength of about 4.0 to about 6.5. In still another embodiment, the polymeric compositions described herein exhibit a tensile strength of about 4.0 to about 6.2.

In other embodiments, the polymeric compositions may include a variety of other polymeric components and additives. The various components of the polymeric compositions may be combined by any suitable method such as blending, including melt blending. Additionally, two or more of the polymeric components of the compositions may be crosslinked.

The isobutylene-based polymer and the polymer having propylene-derived units and optionally any other components of the blends described herein may be combined by any suitable methods including melt-blending. The polymer having isobutylene derived units and the polymer having propylene-derived units may also be crosslinked using a variety of processes known in the art such as dynamic vulcanization or static vulcanization of shaped articles.

The various components of the polymeric composition are described as follows.

Isobutylene-Based Polymer

The isobutylene-based polymers described may be any isobutylene containing polymers. In certain embodiments, the isobutylene-based polymers are halogenated isobutylene-based polymers. In other embodiments, the isobutylene-based polymers are brominated butyl rubber, including star branched butyl rubber.

Exemplary isobutylene-based polymers are available from ExxonMobil Chemical. Exemplary isobutylene-based polymers are described in U.S. Pat. Nos. 2,631,984; 2,964,489; 3,099,644; and 5,021,509.

In certain embodiments, the isobutylene-based polymer may be selected from the group consisting of butyl rubber (such as BUTYL 268™ which is available from ExxonMobil Chemical), polyisobutylene, random copolymers of a $C_4$ to $C_7$ isomonoolefin, and a para-alkylstyrene, such as EXX- PRO™, available from ExxonMobil Chemical and described in U.S. Pat. Nos. 5,162,445; 5,430,118; 5,426,167; 5,548,023; 5,548,029; and 5,654,379. However, it is understood that the scope of this disclosure is not limited to the aforementioned compositions and may include any isobutylene-based polymer.

Halogenated butyl rubber, particularly brominated butyl rubber, is well known. It may be prepared by treating a solution of butyl rubber, in an organic solvent, with bromine and recovering the brominated butyl rubber by contacting it with steam and drying the resulting aqueous slurry.

Brominated butyl rubber may contain up to 3 bromine atoms per carbon-carbon double bond originally present in the polymer or, expressed another way, from about 0.5 wt. % to about 15 wt. % of bromine. Butyl rubber typically contains less than one bromine atom per carbon-carbon double bond originally present in the polymer or from about less than 3 wt. percent bromine. The Mooney viscosity of the exemplary halobutyl rubbers useful in the polymeric compositions described herein are measured at 125° C. (ML 1+8) and range from about 20 to about 80 in one embodiment. In another embodiment, the halobutyl rubbers have a Mooney viscosity from about 25 to about 55, and from about 30 to about 50 in still another embodiment.

Brominated butyl rubber is typically a highly inert, chemically resistant, rubbery polymer which can be compounded and cured to give synthetic rubber outstanding air impermeability, useful in making tire inner tubes.

Brominated butyl rubber has a greater degree of reactivity than butyl rubber, so that it can be blended with other unsaturated polymers and co-vulcanized therewith, which the unreactivity of butyl precludes. Brominated butyl rubber vulcanizates, however, show good air impermeability, heat aging characteristics and general chemical resistance.

Polymer Component Including Propylene-Derived Units (PPU)

The polymer including propylene-derived units ("PPU") has crystalline regions interrupted by non-crystalline regions. The non-crystalline regions may result from regions of non-crystallizable polypropylene segments and/or the inclusion of comonomer units. The crystallinity and the melting point of the PPU are reduced compared to highly isotactic polypropylene by the introduction of errors in the insertion of propylene and/or by the presence of comonomer.

In one embodiment, the PPU comprises at least 75 wt. % of propylene-derived units. In another embodiment, the PPU comprises from 75 wt. % to 95 wt. % of propylene-derived units. In still another embodiment, the PPU comprises from 80 wt. % to 90 wt. % of propylene-derived units.

In one embodiment, the PPU has a Shore A hardness of less than about 90. In another embodiment, the PPU has a Shore A hardness of about 45 to about 90. In still another embodiment, the PPU has a Shore A hardness of about 55 to about 80.

In one embodiment, the PPU has an MFR (ASTM D1238) of about 0.5 to about 200. In another embodiment, the PPU has an MFR of about 1 to about 100. In still another embodiment, the PPU has an MFR of about 1 to about 50.

The crystallinity of the PPU may be expressed in terms of heat of fusion. In certain embodiments, the PPU has a heat of fusion, as determined by DSC, ranging from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 50 J/g, or 60 J/g, or 75 J/g. Without being bound by theory, it is believed that the PPU described herein has generally isotactic crystallizable propylene sequences, and the heats of fusion described above are thought to result from melting of these crystalline segments.

In one embodiment, the PPU has a heat of fusion of less than 60 J/g. In one embodiment, the level of crystallinity of the PPU is also reflected in a lower melting point.

In one embodiment, the PPU has a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol, and a molecular weight distribution $M_w/M_n$ (MWD), sometimes referred to as a "polydispersity index" (PDI), within the range having an upper limit of 40, or 20, or 10, or 5, or 4.5, and a lower limit of 1.5, or 1.8, or 2.0.

In one embodiment, the propylene-derived units of the PPU have an isotactic triad fraction of about 65% to about 99%. In another embodiment, the propylene-derived units of the PPU have an isotactic triad fraction of about 70% to about 98%. In still another embodiment, the propylene-derived units of the PPU have an isotactic triad fraction of about 75% to about 97%.

In some embodiments, the crystallinity of the PPU is reduced by the copolymerization of propylene with limited amounts of one or more comonomers selected from: ethylene, $C_4$-$C_{20}$ alpha-olefins, and polyenes. In one embodiment, the PPU comprises at least 5 wt. % of the alpha-olefin comonomer units. In another embodiment, the PPU comprises about 10 wt. % to about 20 wt. % of the alpha-olefin comonomer units. In another embodiment, the PPU comprises from about 75 wt. % to about 95 wt. % propylene-derived units and from about 5 wt. % to about 25 wt. % of the ethylene-derived units. In still another embodiment, the PPU comprises from about 80 wt. % to about 95 wt. % propylene-derived units and from about 5 wt. % to about 20 wt. % the ethylene-derived units. In an additional embodiment, the PPU comprises at least 70 wt. % of propylene-derived units and about 5.0 wt. % to about 30.0 wt. % of ethylene-derived units. In certain embodiments, the PPU comprises from 6 wt. % to 15 wt. % of ethylene-derived units. In other embodiments, the PPU comprises from 8 wt. % to 12 wt. % of ethylene-derived units. In additional embodiments, the PPU comprises from 8.5 wt. % to 10.5 wt. % of ethylene-derived units. In still other embodiments, the PPU comprises from 8.5 wt. % to 10 wt. % of ethylene-derived units.

The optional polyene units may be derived from any hydrocarbon structure having at least two unsaturated bonds wherein at least one of the unsaturated bonds may be incorporated into a polymer. For example, the optional polyene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, alkenyl norbornenes, alkylidene norbornenes, cycloalkenyl norbornenes, and cycloalkyliene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, divinyl benzene, and tetracyclo(A-11,12)-5,8-dodecene.

In one embodiment, the PPU incorporates from about 0.1 wt. % to about 25 wt. % of polyene-derived units, based on the combined weight of the propylene-derived units, polyene-derived units, and the alpha-olefin-derived units. Other embodiments of the weight percent of polyene-derived units, include 0.1-15 wt % of polyene-derived units, 1-12 wt % of polyene-derived units, 0.1-10 wt %, 1-9 wt %, 2-9 wt %, 2-7 wt %, 0.5-5 wt %, 1-5 wt % and 1-3 wt %, and 3-5 wt %; wherein each of these ranges of weight percentages of polyene-derived units is based on the combined weight of the propylene-derived units, polyene derived units, and the alpha-olefin-derived units. It should be understood that these ranges for a polyene-derived unit are suitable for any specific type of polyene-derived unit, including a diene-derived unit.

In one embodiment, the polyene-derived units are derived from 5-ethylidene-2-norbornene. In another embodiment, the polyene-derived units are derived from 5-vinyl-2-norbornene. In still another embodiment, the polyene-derived units are derived from divinyl benzene.

The polymeric compositions described herein are not limited by any particular polymerization method for preparing the PPU of the invention, and the polymerization processes described herein are not limited by any particular type of reaction vessel.

In one embodiment, the catalyst system used to produce the PPU includes one or more transition metal compounds and one or more activators. When alumoxane or aluminum alkyl activators are used, the combined pre-catalyst-to-activator molar ratio is from 1:5000 to 10:1. When ionizing activators are used, the combined pre-catalyst-to-activator molar ratio is from 10:1 to 1:10. Multiple activators may be used, including using mixtures of alumoxanes or aluminum alkyls with ionizing activators. In other embodiments, the methods and catalyst systems disclosed in U.S. Patent Application 20040024146 published Feb. 5, 2004 may be used to produce the PPU. In still other embodiments, the PPU may be produced using catalyst systems such as the nonmetallocene, metal-centered, heteroaryl ligand catalyst systems as described in U.S. Patent Application 20030204017 published Oct. 30, 2003.

One or more reactors in series or in parallel may be used in the present invention. The catalyst component and activator may be delivered as a solution or slurry, either separately to the reactor, activated in-line just prior to the reactor, or pre-activated and pumped as an activated solution or slurry to the reactor. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added either to the first reactor in the series or to both reactors with one component being added to first reaction and another component to the other reactors.

Exemplary PPU's are commercially available from ExxonMobil Chemical under the tradename Vistamaxx™ and from The Dow Chemical Company under the tradename Versify™. Specific non-limiting examples of suitable Vistamaxx™ polymers having both propylene-derived units and diene-derived units are referred to herein as PPU 3 AND PPU 4. For further general process condition information suitable for use in preparing the PPU's, see U.S. Pat. No. 5,001,205 and PCT publications WO 96/33227 and WO 97/22639. For further information on gas phase polymerization processes, see U.S. Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; and 5,677,375, and European publications EP-A-0 794 200; EP-A-0 802 202; and EP-B-634 421. For information relating to methods of introducing liquid catalyst systems into fluidized bed polymerizations into a particle lean zone, see U.S. Pat. No. 5,693,727. For further information on slurry polymerization processes, see U.S. Pat. Nos. 3,248,179 and 4,613,484. PCT publication WO 96/08520 and U.S. Pat. No. 5,712,352 describe a polymerization process operated in the absence of or essentially free of any scavengers, although the use of scavengers is contemplated for producing the PPU described herein.

In one embodiment, the polymeric compositions described herein incorporate from about 1 wt. % to about 99 wt. % of the PPU first component. In another embodiment, the polymeric compositions described herein incorporate from about 5 wt. % to about 95 wt. % of the PPU first component. In a second embodiment, the polymeric compositions described herein incorporate from about 10 wt. % to about 90 wt. % of the PPU first component. In a third embodiment, the polymeric compositions described herein incorporate from about 20 wt. % to about 80 wt. % of the PPU first component. In other embodiments, the polymeric compositions described herein incorporate from about 40 wt. % to about 60 wt. % of the PPU first component. Any upper limit recited may, of course, be combined with any lower limit for selected subranges.

Additional Components

As mentioned above, the polymeric compositions described herein may include polymeric and additive components in addition to the PPU and IBP components described above. The following is a description of exemplary additional components.

Additives

The polymeric compositions describe herein may include one or more additive components in addition to the polymer components described above. Various additives may be present to enhance a specific property or may be present as a result of processing of the individual components. Additives which may be incorporated include, but are not limited to, fire retardants, antioxidants, plasticizers, pigments, vulcanizing or curative agents, vulcanizing or curative accelerators, cure retarders, processing aids, flame retardants, tackifying resins, flow improvers, and the like. Antiblocking agents, coloring agents, lubricants, mold release agents, nucleating agents, reinforcements, and fillers (including granular, fibrous, or powder-like) may also be employed. Nucleating agents and fillers may improve the rigidity of the article. The list described herein is not intended to be inclusive of all types of additives which may be employed with the present invention.

It will be appreciated that other additives may be employed to enhance properties of the composition. As is understood by those skilled in the art, the polymeric compositions may be modified to adjust the characteristics of the blend as desired.

In one embodiment, the polymeric compositions described herein incorporate about 1 wt. % to about 25 wt. % of a tackifier resin. In another embodiment, the polymeric compositions described herein incorporate about 2 wt. % to about 20 wt. % of a tackifier resin. In still another embodiment, the polymeric compositions described herein incorporate about 3 wt. % to about 15 wt. % of a tackifier resin.

The polymeric compositions described herein may also contain inorganic particulate fillers, which may improve the mechanical and wear properties of the compositions, particularly in compositions including crosslinked components. The amount of inorganic filler used is typically less than 60 wt. %, or less than 50 wt. %, or less than 40 wt. %, or less than 30 wt. %, based on the total weight of the composition. The inorganic fillers include particles less than 1 mm. in diameter, rods less than 1 cm in length, and plates less than 0.2 $cm^2$ in surface area. Exemplary particulate fillers include carbon black, clays, titanium and magnesium oxides, and silica. In addition, other particulate fillers, such as calcium carbonate, zinc oxide, whiting, and magnesium oxide, can also be used. An example of a rod-like filler is glass fiber. An exemplary plate-like filler is mica. The addition of very small particulates, commonly referred to as nanocomposites, is also contemplated. The addition of the fillers may change the properties of the compositions described herein. For example, polymeric compositions including inorganic filler may have improved thermal stability and resistance to wear. The addition of white fillers may improve the temperature changes of the hydrocarbon polymers on exposure to sunlight. The addition of fillers beyond a certain level may lead to a dramatic increase in the viscosity and a corresponding decrease in processability. This threshold level is referred to as the percolation threshold. In addition to the increase in viscosity, the percolation threshold is accompanied by an improvement in the elastic properties, and at levels slightly higher than the percolation threshold there is a drop in the elastic recovery of the blend. The percolation threshold is attained at different levels of addition of fillers depending on the type of filler used. Generally, the percolation threshold is attained at lower levels for fillers with a smaller size than for fillers with a larger size.

The compositions described herein may contain process oil in the range of from 0 to 500 parts by weight, or from 2 to 200 parts by weight, or from 5 to 150 parts by weight, or from 10 to 100 parts by weight, per hundred parts of total polymer. For purposes of this disclosure, the term "process oil" refers to any of a variety of oils having molecular weights (Mn) of less than 20,000. The addition of process oil in moderate amounts may lower the viscosity and flexibility of the blend while improving the properties of the blend at temperatures near and below 0° C. It is believed that these potential benefits arise by the lowering of the glass transition temperature (Tg) of the blend. Adding process oil to the blend may also improve processability and provide a better balance of elastic and tensile strength. The process oil is typically known as extender oil in rubber applications. Process oils include hydrocarbons having either (a) traces of hetero atoms such as oxygen or (b) at least one hetero atom such as dioctyl plithalate, ethers, and polyethers. Process oils have a boiling point to be substantially involatile at 200° C. These process oils are commonly available either as neat solids, liquids, or as physically absorbed mixtures of these materials on an inert support (e.g., clay, silica) to form a free flowing powder. Process oils usually include a mixture of a large number of chemical compounds which may consist of linear, acyclic but branched, cyclic, and aromatic carbonaceous structures. Another family of process oils is certain organic esters and alkyl ether esters having molecular weights (Mn) of less than 20,000. Combinations of process oils may also be used in the practice of the invention. The process oil should be compatible or miscible with the polymer blend composition in the melt, and may be substantially miscible in the PPU at room temperature. Process oils may be added to the blend compositions by any of the conventional means known in the art, including the addition of all or part of the process oil prior to recovery of the polymer, and addition of all or part of the process oil to the polymer as a part of a compounding step for the interblending of the PPU. The compounding step may be carried out in a batch mixer, such as a mill, or an internal mixer, such as a Banbury mixer. The compounding operation may also be conducted in a continuous process, such as a twin screw extruder. The addition of process oils to lower the glass transition temperature of blends of isotactic polypropylene and ethylene propylene diene rubber is described in U.S. Pat. Nos. 5,290,886 and 5,397,832.

The addition of process aids, such as a mixture of fatty acid ester or calcium fatty acid soap bound on a mineral filler, to the compositions described herein may help the mixing of the composition and the injection of the composition into a mold. Other examples of process aids are low molecular weight polyethylene copolymer wax and paraffin wax. The amount of process aid used may be within the range of from 0.5 to 5 phr.

Adding antioxidants to the compositions described herein may improve the long term aging. Examples of antioxidants include, but are not limited to quinolein, e.g., trimethylhydroxyquinolein (TMQ); imidazole, e.g., zincmercapto toluyl imidazole (ZMTI); and conventional antioxidants, such as hindered phenols, lactones, and phosphites. The amount of antioxidants used may be within the range of from 0.001 to 5 phr.

The polymeric compositions described herein may include one or more non-functionalized plasticizers ("NFP's") where the non-functionalized plasticizer has a kinematic viscosity ("KV") of 2 cSt or more at 100° C. For purposes of this disclosure, if the NFP has a flash point of less than 100° C. it is defined to have a KV at 100° C. of less than 2 cSt. In one embodiment, the non-functionalized plasticizer is polyalphaolefin oligomers of $C_5$ to $C_{14}$ olefins having a Kinematic viscosity of 10 cSt or more at 100° C. and a viscosity index of 120 or more. In one embodiment, the non-functionalized plasticizers incorporate oligomers of $C_5$ to $C_{14}$ olefins having a viscosity index of 120 or more. In another embodiment, the non-functionalized plasticizers include oligomers of $C_6$ to $C_{14}$ olefins having a viscosity index of 120 or more. In still another embodiment, the non-functionalized plasticizers include linear and/or branched paraffinic hydrocarbon compositions produced by one or more gas to liquids process having a number average molecular weight of 500 to 20,000. For additional information regarding non-functionalized plasticizers, see PCT published application WO 04/014998.

In one embodiment, the polymeric compositions described herein incorporate from about 1 wt. % to about 95 wt. % of one or more non-functionalized plasticizers having a kinematic viscosity ("KV") of at least 2 cSt at 100° C. In another embodiment, the polymeric compositions described herein incorporate from about 5 wt. % to about 85 wt. % of one or more non-functionalized plasticizers having a kinematic viscosity ("KV") of at least 2 cSt at 100° C. In still another embodiment, the polymeric compositions described herein incorporate from about 5 wt. % to about 75 wt. % of one or more non-functionalized plasticizers having a kinematic viscosity ("KV") of at least 2 cSt at 100° C. In one embodiment, the flashpoint of the non-functionalized plasticizers is at least 200° C. In another embodiment, the flashpoint of the non-functionalized plasticizers is at least 195° C. In still another embodiment, the flashpoint of the non-functionalized plasticizers is at least 190° C.

In one embodiment, the polymeric compositions described herein include about 1 wt. % to about 60 wt. % of an additive selected from the group consisting of a filler, a pigment, a coloring agent, a processing oil, a plasticizer, and mixtures thereof. In another embodiment, the polymeric compositions described herein include about 5 wt. % to about 50 wt. % of an additive selected from the group consisting of a filler, a pigment, a coloring agent, a processing oil, a plasticizer, and mixtures thereof. In still another embodiment, the polymeric compositions described herein include about 10 wt. % to about 40 wt. % of an additive selected from the group consisting of a filler, a pigment, a coloring agent, a processing oil, a plasticizer, and mixtures thereof.

Blending Polymeric Components and Additives

The compositions described herein may be prepared by any procedure that provides an intimate mixture of the polymeric components. Generally, the first step of the process is mixing the polymeric components and optional additives, such as process oil, fillers, colorants, antioxidants, nucleators, and flow improvers using equipment such as, but not limited to a Carver press for melt pressing the components together, internal mixers such as a Banbury mixer or a Brabender mixer for solution or melt blending of the components, and equipment used for continuous mixing procedures including single and twin screw extruders, static mixers, impingement mixers, as well as other machines and processes designed to disperse the components in intimate contact. A complete mixture of the polymeric components is indicated by the uniformity of the morphology of the composition. Such procedures are well known.

In embodiments in which crosslinking of the polymeric components is desired, the next step is mixing a chemical curative, such as peroxides or sulfur compounds, with the intimate mixture, and then fabricating the intimate mixture including the chemical curative into the final shape of the article and raising the temperature for an extended period of time to allow the crosslinking to take place. In another embodiment, the next step is fabricating the intimate mixture into the final shape of the article, and then exposing the fabricated mixture to an external curative agent, such as high energy radiation, to allow crosslinking of the PPU.

For addition information regarding processes for preparation of polymeric blend compositions, including the crosslinking of polymeric components, see copending U.S. Patent Application Ser. No. 60/519,975 filed Nov. 14, 2003.

Processed Polymeric Compositions

As discussed above, the unique combination of processability and performance attributes of the polymeric compositions described herein make them useful to produce a variety of different types of materials to produce a wide assortment of products. Among the products that may be produced using the polymeric compositions described herein are molded articles.

Any of various known molding methods such as pressure molding, injection molding, blow molding, inflation molding, extrusion molding, Engel molding, vacuum molding, and cast molding may be employed to produce molded articles from the compositions described herein.

The polymeric compositions described herein are particularly useful for producing injection molded articles such as pharmaceutical stoppers.

Experimental Evaluations

Experimental evaluations of comparative polymeric compositions and polymeric compositions exemplary of those described here were conducted. Table I lists the polymeric components used in all of the polymeric compositions evaluated with selected properties indicated. Included among the polymeric components listed are two isobutylene-based polymers. Bromobutyl 2211 is a brominated copolymer of isobutylene and isoprene. EXXPRO™ 3443 is a brominated copolymer of isobutylene and paramethylstyrene. Both copolymers are commercially available from ExxonMobil Chemical. Also listed in Table I are PPU's designated PPU 1 and PPU 2. PPU 1 is a copolymer having a propylene content of 84.9 wt. % and an ethylene content of 15.1 wt. %. PPU 1 has an MFR of 18, a heat fusion of 13 J/g, and an isotactic triad fraction of approximately 90% for the propylene-derived units. PPU 2 is a copolymer having a propylene content of 88.3 wt. % and an ethylene content of 11.7 wt. %. PPU 2 has a Mooney viscosity of 10.8, a heat of fusion of 29 J/g, and an isotactic triad fraction of approximately 90% for the propylene-derived units. Table I also identifies various additional components included in the blend, including a non-functionalized plasticizers, PARAPOL 2255, commercially available from ExxonMobil Chemical. Amounts of all components included are identified in parts by weight. Formulations 1 and 6 are comparative formulations including an isobutylene-based polymer without the addition of polymers including propylene-derived units as described herein.

TABLE I

| Formulation | Comp. 1 | 2 | 3 | 4 | 5 | Comp. 6 | 7 | 8 | 9 | 10 |
|---|---|---|---|---|---|---|---|---|---|---|
| Polymers | | | | | | | | | | |
| BROMOBUTYL ™ 2211 | 100 | 95 | 90 | 95 | 9 | 0 | 0 | 0 | 0 | 0 |
| EXXPRO ™ 3443 | 0 | 0 | 0 | 0 | 0 | 100 | 95 | 90 | 95 | 90 |
| PPU 1 | 00 | 5 | 10 | 0 | 0 | 0 | 5 | 10 | 0 | 0 |
| PPU 2 | 0 | 0 | 0 | 5 | 10 | 0 | 0 | 0 | 5 | 10 |
| Fillers | | | | | | | | | | |
| Polestar 200R | 40 | 40 | 40 | 40 | 40 | 90 | 90 | 90 | 90 | 90 |
| Mistronbond R10C | 40 | 40 | 40 | 40 | 40 | | | | | |
| $TiO_2$ | 4 | 4 | 4 | 4 | 4 | 4 | 4 | 4 | 4 | 4 |
| Plasticizers | | | | | | | | | | |
| PARAPOL 2255 | 5 | 5 | 5 | 5 | 5 | 5 | 5 | 5 | 5 | 5 |
| Additives | | | | | | | | | | |
| Maglite D | 3 | 3 | 3 | 3 | 3 | | | | | |

Table II reports various rheological properties of the polymeric compositions identified in Table I.

TABLE II

RHEOLOGICAL PROPERTIES

| Formulation | | Comp. 1 | 2 | 3 | 4 | 5 | Comp. 6 | 7 | 8 | 9 | 10 |
|---|---|---|---|---|---|---|---|---|---|---|---|
| Mooney ML(1 + 4) | | | | | | | | | | | |
| Test temp | [° C.] | 100 | 100 | 100 | 100 | 100 | 100 | 100 | 100 | 100 | 100 |
| Test time | [min] | 4 | 4 | 4 | 4 | 4 | 4 | 4 | 4 | 4 | 4 |
| Preheat | [min] | 1 | 1 | 1 | 1 | 1 | 1 | 1 | 1 | 1 | 1 |
| Init | [MU] | 78 | 77 | 79 | 83 | 82 | 105 | 105 | 106 | 110 | 116 |
| Visc@4 | [MU] | 61 | 60 | 57 | 62 | 59 | 87 | 84 | 82 | 87 | 85 |
| Mooney Scorch T10 (125° C.) | | | | | | | | | | | |
| Test temp | [° C.] | 125 | 125 | 125 | 125 | 125 | 125 | 125 | 125 | 125 | 125 |
| Test time | [min] | 15 | 15 | 15 | 15 | 15 | 15 | 15 | 15 | 15 | 15 |
| Preheat | [min] | 1 | 1 | 1 | 1 | 1 | 1 | 1 | 1 | 1 | 1 |
| Mm | [MU] | 26 | 16 | 23 | 24 | 24 | 39 | 37 | 35 | 39 | 36 |
| tMm | [min] | 2.68 | 4.13 | 2.60 | 2.72 | 2.62 | 3.03 | 3.38 | 3.80 | 3.78 | 3.97 |
| T3 | [min] | 3.82 | 5.57 | 3.85 | 4.00 | 3.83 | 4.68 | 5.23 | 5.72 | 5.45 | 5.90 |
| T5 | [min] | 4.17 | 5.68 | 4.20 | 4.40 | 4.20 | 5.22 | 5.88 | 6.43 | 6.08 | 6.60 |
| T10 | [min] | 4.78 | 6.13 | 4.83 | 5.13 | 4.83 | 6.22 | 7.15 | 7.97 | 7.25 | 8.03 |
| MDR with curves & Multi data | | | | | | | | | | | |
| Test Time | [min] | 15 | 15 | 15 | 15 | 15 | 15 | 15 | 15 | 15 | 15 |
| Test Temp | [° C.] | 180 | 180 | 180 | 180 | 180 | 180 | 180 | 180 | 180 | 180 |
| Osc. angle | [Deg] | 0.5 | 0.5 | 0.5 | 0.5 | 0.5 | 0.5 | 0.5 | 0.5 | 0.5 | 0.5 |
| ML | [dNm] | 1.7 | 1.7 | 1.5 | 1.7 | 1.5 | 2.2 | 2.0 | 1.9 | 2.2 | 2.1 |
| MH | [dNm] | 7.5 | 7.3 | 6.7 | 7.4 | 6.7 | 8.9 | 7.9 | 7.8 | 8.5 | 8.1 |
| MH-ML | [dNm] | 5.8 | 5.7 | 5.2 | 5.7 | 5.2 | 6.7 | 5.9 | 5.8 | 6.4 | 6.0 |
| Ts2 | [min] | 0.85 | 0.87 | 0.93 | 0.87 | 0.93 | 1.38 | 1.56 | 1.66 | 1.53 | 1.62 |
| t50 | [min] | 1.11 | 1.14 | 1.16 | 1.14 | 1.14 | 2.25 | 2.31 | 2.42 | 2.41 | 2.40 |
| t90 | [min] | 3.34 | 3.42 | 3.55 | 3.41 | 3.53 | 7.55 | 7.73 | 8.11 | 8.01 | 8.12 |
| Physical Properties Rubber Tensile | | | | | | | | | | | |
| Test Temp. | [° C.] | 23 | 23 | 23 | 23 | 23 | 23 | 23 | 23 | 23 | 23 |
| Press cured -180° C./Tc90 × 1.4 min | | | | | | | | | | | |
| Hardness A | [Shore A] 3 sec/30 sec | 46/44 | 48/45 | 50/47 | 51/49 | 54/42 | 47/44 | 47/43 | 49/46 | 52/49 | 55/52 |
| Mod 100% | [MPa] | 1.7 | 1.8 | 1.8 | 2.2 | 2.4 | 1.4 | 1.3 | 1.5 | 1.7 | 2.0 |
| Mod 200% | [MPa] | 2.7 | 2.7 | 2.7 | 3.2 | 3.4 | 2.2 | 2.2 | 2.5 | 2.7 | 3.0 |
| Mod 300% | [MPa] | 3.2 | 3.1 | 3.1 | 3.6 | 3.8 | 2.7 | 2.8 | 3.1 | 3.3 | 3.5 |
| Tensile at break | [MPa] | 5.0 | 5.3 | 5.0 | 5.1 | 6.0 | 4.3 | 4.3 | 4.3 | 4.5 | 5.0 |
| Elongation | [%] | 610 | 640 | 620 | 605 | 605 | 640 | 690 | 635 | 635 | 615 |
| Compression Set - 180° C. Tc90 × 1.4 min | | | | | | | | | | | |
| % Compress | [%] | 25 | 25 | 25 | 25 | 25 | 25 | 25 | 25 | 25 | 25 |
| Test time | [hr] | 24 | 24 | 24 | 24 | 24 | 24 | 24 | 24 | 24 | 24 |
| Test temp | [° C.] | 120 | 120 | 120 | 120 | 120 | 120 | 120 | 120 | 120 | 120 |
| Comp. Set | [%] | 40 | 39 | 41 | 39 | 39 | 42 | 42 | 41 | 42 | 43 |
| Tear Strength. KN/m | | | | | | | | | | | |
| Test Temp. | [° C.] | 23 | 23 | 23 | 23 | 23 | 23 | 23 | 23 | 23 | 23 |
| KN/m | | 19.4 | 19.6 | 18 | 17.7 | 17.4 | 16.7 | 20.5 | 20.3 | 19.9 | 18.9 |

Table III reports injection transfer molding data for the ten formulations identified in Table I. Each formulation was injection molded in four runs and the weight of the polymer throughout and injection pressure for each run was recorded. The average throughput (sample weight) and injection pressure values of each formulation were recorded. The percent change of the average values for the isobutylene-based polymer and PPU formulations from the corresponding comparative formulation were calculated and reported in Table III.

TABLE III

REP INJECTION TRANSFER MOLDING VALUES

| Formulation | Comp. 1 | 2 | 3 | 4 | 5 | Comp. 6 | 7 | 8 | 9 | 10 |
|---|---|---|---|---|---|---|---|---|---|---|
| Sample weight (g) | 6.89 | 7.01 | 7.04 | 6.58 | 7.1 | 7.01 | 6.75 | 6.76 | 6.81 | 6.54 |
| | 6.01 | 6.8 | 6.55 | 6.53 | 7.33 | 6.98 | 6.29 | 6.61 | 6.55 | 6.33 |

TABLE III-continued

REP INJECTION TRANSFER MOLDING VALUES

| Formulation | Comp. 1 | 2 | 3 | 4 | 5 | Comp. 6 | 7 | 8 | 9 | 10 |
|---|---|---|---|---|---|---|---|---|---|---|
| | 6.5 | 6.71 | 6.83 | 6.44 | 7.1 | 6.83 | 6.19 | 6.48 | 6.3 | 6.44 |
| | 6.45 | 6.83 | 7.05 | 6.66 | 7.2 | 6.95 | 6.5 | 6.8 | 6.9 | 6.45 |
| AVG | 6.5 | 6.8 | 6.9 | 6.6 | 7.2 | 6.9 | 6.4 | 6.7 | 6.6 | 6.4 |
| STDEV | 0.36 | 0.13 | 0.23 | 0.09 | 0.11 | 0.08 | 0.25 | 0.15 | 0.27 | 0.09 |
| Injection Pressure (mPa) | 23.8 | 23.6 | 23.4 | 24.0 | 23.5 | 23.6 | 23.4 | 23.4 | 23.9 | 23.7 |
| | 23.9 | 23.7 | 23.6 | 23.7 | 23.6 | 23.9 | 23.7 | 23.6 | 23.6 | 23.7 |
| | 24.0 | 23.8 | 23.2 | 24.1 | 23.6 | 23.9 | 23.7 | 23.7 | 23.7 | 23.6 |
| | 23.9 | 23.7 | 23.3 | 23.8 | 23.7 | 23.8 | 23.5 | 23.5 | 23.8 | 23.8 |
| AVG | 23.9 | 23.7 | 23.38 | 23.9 | 23.6 | 23.8 | 23.58 | 23.55 | 23.75 | 23.7 |
| STDEV | 0.082 | 0.082 | 0.171 | 0.183 | 0.082 | 0.141 | 0.150 | 0.129 | 0.129 | 0.082 |
| % change from throughput avg. | 0.0 | 5.8 | 6.3 | 1.4 | 11.1 | 0.0 | −7.3 | −4.0 | −4.4 | −7.2 |
| % change from pressure avg. | 0.0 | −0.8 | −2.2 | 0.0 | −1.3 | 0.0 | −0.9 | −1.1 | −0.2 | −0.4 |

Pot size: 25 mm, injection speed: 20 mm/s, injection pressure: 250 bar, extruder temp.: 80° C., injection unit temperature: 80° C., Cure Tc 90 × 1.4 @ 180° C.

The data reported in Tables II and III reveal that inclusion of polymers including propylene-derived units in the blends at levels of 5 parts by weight and 10 parts by weight based upon 100 parts per weight of the isobutylene-based polymers decreases Mooney viscosity, increases injection molding throughput, as measured by volume per unit of time, by up to approximately 10%, and decreases injection pressure. At the same time, cure properties such as scorch times improve, physical properties such as 100% modulus and tensile strength increase, while compression set is unchanged. The blends incorporating the isobutylene-based polymer and the polymer including propylene-derived units display a better balance of processability and properties compared to the isobutylene-based compositions of the comparative formulations.

Additional experimental evaluations of comparative polymeric compositions and polymeric compositions exemplary of those described herein were conducted. Table IV lists the polymeric components used in the additional polymeric compositions evaluated with selected properties indicated. Included among the polymeric components listed are two isobutylene-based polymers. Butyl 268 is a copolymer of isobutylene and isoprene with a specific gravity of 0.93. EXXPRO™ 3035 is a brominated copolymer of isobutylene and paramethylstyrene with a specific gravity of 0.92. Both isobutylene-based polymers are commercially available from ExxonMobil Chemical. Also listed in Table IV are PPU's designated PPU 3 and PPU 4. Table IV also identifies various additional components included in the blend. Amounts of all components included are identified in parts by weight. Formulations 11 and 16 are comparative formulations including an isobutylene-based polymer without the addition of polymers including propylene-derived units as described herein. PPU 3 is material comprising an ethylene-propylene-diene terpolymer (ENB is the diene) with 10.75 wt % ethylene, 89.25 wt % propylene, and 1.23 wt % ENB, the balance comprising Irganox as a stabilizer; the terpolymer having a Mooney viscosity of 23.8 PPU 4 is material comprising an ethylene-propylene-diene terpolymer (ENB is the diene) with 12.6 wt % ethylene, 87.4 wt % propylene, and 2.82 wt % ENB, the balance comprising Irganox as a stabilizer; the terpolymer having a Mooney viscosity of 16.5.

TABLE IV

| Component | 1 | 2 | 3 | 4 | 5 | 6 | 7 | 8 | 9 | 10 |
|---|---|---|---|---|---|---|---|---|---|---|
| Polymer | | | | | | | | | | |
| Butyl 268 | 100.0 | 90.0 | 80.0 | 90.0 | 80.0 | | | | | |
| EXXPRO ™ 3035 | | | | | | 100.0 | 90.0 | 80.0 | 90.0 | 80.0 |
| PPU 3 | | 10.0 | 20.0 | | | | 10.0 | 20.0 | 10.0 | 20.0 |
| PPU 4 | | | | 10.0 | 20.0 | | | | 10.0 | 20.0 |
| Sunpar 2280 | | | | | | 5 | 5 | 5 | 5 | 5 |
| Neoprene WRT | 5 | 5 | 5 | 5 | 5 | | | | | |
| N330 Carbon Black | 50 | 50 | 50 | 50 | 50 | 48 | 48 | 48 | 48 | 48 |
| Castor oil | 5 | 5 | 5 | 5 | 5 | | | | | |
| Perkalink 900 | | | | | | 0.75 | 0.75 | 0.75 | 0.75 | 0.75 |
| Curatives (Mill Addition) | | | | | | | | | | |
| DHT-4A-2 | | | | | | 1.1 | 1.1 | 1.1 | 1.1 | 1.1 |
| SP 1045 | 10 | 10 | 10 | 10 | 10 | 6 | 6 | 6 | 6 | 6 |
| Stearic Acid | | | | | | 0.4 | 0.4 | 0.4 | 0.4 | 0.4 |
| Zinc Oxide | 5.0 | 5.0 | 5.0 | 5.0 | 5.0 | 1.75 | 1.75 | 1.75 | 1.75 | 1.75 |
| Perkacit MBTS | | | | | | 1.1 | 1.1 | 1.1 | 1.1 | 1.1 |
| Total | 175.0 | 175.0 | 175.0 | 175.0 | 175.0 | 164.1 | 164.1 | 164.1 | 164.1 | 164.1 |

Table V reports various rheological properties of the polymeric compositions identified in Table IV.

TABLE V

| Component | | Butyl 268 | | | | | EXXPRO™ 3035 | | | | |
|---|---|---|---|---|---|---|---|---|---|---|---|
| | | | PPU 3 | | PPU 4 | | | PPU 3 | | PPU 4 | |
| | | 1 | 2 | 3 | 4 | 5 | 6 | 7 | 8 | 9 | 10 |
| Mooney Viscosity, ML @ 100° C. | | | | | | | | | | | |
| ML (1 + 4) | [MU] | 75 | 77 | 73 | 78 | 70 | 77 | 71 | 72 | 71 | |
| Mooney Scorch, MS @ 135° C. | | | | | | | | | | | |
| t5 | [min] | 51 | >60 | >60 | >60 | >60 | 38 | 36 | 34 | 39 | |
| MDR @ 180° C., 60 min., 0.5° ARC | | | | | | | | | | | |
| ML | [dNm] | 2.44 | 2.51 | 2.07 | 2.58 | 2.28 | 2.29 | 2.03 | 2.08 | 2.07 | 2 |
| MH | [dNm] | 10.23 | 11.43 | 10.19 | 11.94 | 10.42 | 10.37 | 8.93 | 8.52 | 9.36 | 9 |
| MH-ML | [dNm] | 7.79 | 8.92 | 8.12 | 9.36 | 8.14 | 8.08 | 6.9 | 6.44 | 7.29 | 7 |
| ts2 | [Min.] | 5.96 | 5.09 | 5.85 | 5.83 | 7.16 | 4.19 | 5.09 | 4.63 | 5.18 | 5 |
| t90 | [Min.] | 35.51 | 38.75 | 45.73 | 46.42 | 46.58 | 16.06 | 16.69 | 17.13 | 18.41 | 21 |
| MDR @ 200° C., 60 min., 0.5° ARC | | | | | | | | | | | |
| ML | [dNm] | 2.16 | 2.26 | 2.04 | 2.31 | 2.09 | 2.02 | 1.77 | 1.86 | 1.81 | 1 |
| MH | [dNm] | 10.26 | 11.27 | 10.51 | 12.65 | 11.41 | 9.89 | 8.27 | 8.07 | 8.96 | 8 |
| MH-ML | [dNm] | 8.1 | 9.01 | 8.47 | 10.34 | 9.32 | 7.87 | 6.5 | 6.21 | 7.15 | 6 |
| ts2 | [Min.] | 2.18 | 2.07 | 2.8 | 2.28 | 2.54 | 2.06 | 2.49 | 2.32 | 2.53 | 2 |
| t90 | [Min.] | 14.59 | 17.15 | 22.4 | 25.12 | 24.17 | 7.79 | 7.7 | 10.29 | 9.66 | 11 |
| Rubber Tensile Test Press Cure @ 180° C., Tc90 × 1.4 Original physicals | | | | | | | | | | | |
| Hardness | [Shore A 3°/30] | 61/58 | 69/66 | 73/70 | 67/64 | 70/66 | 58/54 | 61/58 | 69/66 | 61/57 | 66/62 |
| Mod 50% | [MPa] | 1.49 | 1.80 | 2.35 | 1.78 | 1.89 | 1.14 | 1.33 | 1.65 | 1.24 | 1.53 |
| Mod 100% | [MPa] | 2.00 | 2.60 | 3.00 | 2.40 | 2.60 | 1.70 | 1.90 | 2.40 | 1.80 | 2.20 |
| Mod 200% | [MPa] | 3.10 | 4.30 | 4.80 | 4.10 | 4.30 | 3.60 | 4.00 | 4.50 | 3.80 | 4.20 |
| Mod 300% | [MPa] | 4.70 | 6.60 | 7.20 | 6.40 | 6.40 | 6.80 | 7.10 | 7.70 | 6.80 | 7.40 |
| Tensile at break | [MPa] | 13.6 | 14.0 | 14.6 | 14.3 | 13.8 | 15.7 | 16.0 | 15.9 | 15.8 | 15.7 |
| Elongation | [%] | 750 | 630 | 640 | 645 | 635 | 580 | 600 | 585 | 605 | 595 |
| Hot Air Ageing, 4 days at 180° C. | | | | | | | | | | | |
| Hardness | [Shore A 3°/30] | 87/84 | 90/87 | 93/91 | 88/86 | 92/89 | 66/61 | 68/63 | 76/62 | 66/62 | 70/66 |
| Delta hardness | | .+26 | .+21 | .+21 | .+22 | .+23 | .+7 | .+5 | .+6 | .+5 | .+4 |
| Mod 50% | [MPa] | 2.69 | 3.44 | 3.90 | 3.52 | 3.68 | 1.5 | 1.65 | 2.36 | 1.56 | 1.79 |
| Mod 100% | [MPa] | 2.7 | 3.9 | 4.2 | 4.1 | 4.1 | 2.0 | 2.2 | 3.1 | 2.2 | 2.5 |
| Mod 200% | [MPa] | | | | | | 3.5 | 3.7 | 4.8 | 3.9 | 4.2 |
| Mod 300% | [MPa] | | | | | | 5.3 | 5.4 | 6.6 | 5.6 | 5.9 |
| Tensile at break | [MPa] | 3.1 | 3.9 | 4.3 | 4.3 | 4.3 | 8.3 | 8.3 | 8.3 | 7.8 | 7.1 |
| Elongation | [%] | 285 | 200 | 220 | 160 | 252 | 525 | 525 | 445 | 495 | 410 |
| Hot Air Ageing, 14 days at 180° C. | | | | | | | | | | | |
| Hardness | [Shore A 3°/30] | 87/82 | 89/85 | 92/88 | 88/85 | 91/87 | 68/62 | 67/61 | 77/70 | 69/63 | 72/66 |
| Delta hardness | | .+24 | .+19 | .+18 | .+21 | .+21 | .+8 | .+3 | .+4 | .+5 | .+4 |
| Mod 50% | [MPa] | | | | | | 1.66 | 1.67 | 2.26 | 1.75 | 2.05 |
| Mod 100% | [MPa] | | | | | | 2.2 | 2.2 | 2.7 | 2.4 | 2.6 |
| Mod 200% | [MPa] | | Breaks like a wooden stick | | | | 3.2 | 3.0 | 3.3 | 3.2 | 3.1 |
| Mod 300% | [MPa] | | | | | | 3.5 | | | | |
| Tensile at break | [MPa] | 2.6 | 3.0 | 3.7 | 3.2 | 3.3 | 3.5 | 3.5 | 3.5 | 3.3 | 3.0 |
| Elongation | [%] | | NO ELONGATION ANY MORE | | | | 270 | 310 | 285 | 295 | 190 |
| Steam Ageing, 14 days at 180° C. | | | | | | | | | | | |
| Hardness | [Shore A 3°/30] | 79/76 | 81/78 | 83/81 | 79/76 | 81/78 | 61/58 | 63/60 | 70/67 | 62/58 | 66/63 |
| Delta hardness | | .+16 | .+12 | .+11 | .+12 | .+12 | .+4 | .+2 | .+1 | .+1 | .+1 |
| Mod 50% | [MPa] | 2.76 | 2.89 | 3.36 | 2.68 | 2.98 | 1.18 | 1.3 | 1.8 | 1.23 | 1.51 |
| Mod 100% | [MPa] | 3.6 | 3.9 | 4.4 | 3.6 | 4 | 1.8 | 2.0 | 2.6 | 1.9 | 2.2 |
| Mod 200% | [MPa] | 5.8 | 6.5 | 7.2 | 6.1 | 6.7 | 4.2 | 4.3 | 5.2 | 4.1 | 4.5 |
| Mod 300% | [MPa] | 8.4 | 9.5 | 10.4 | 9.1 | 9.9 | 8.0 | 7.8 | 9.1 | 7.7 | 8.1 |

TABLE V-continued

| | | Butyl 268 | | | | | EXXPRO ™ 3035 | | | |
| | | PPU 3 | | PPU 4 | | | PPU 3 | | PPU 4 | |
| Component | | 1 | 2 | 3 | 4 | 5 | 6 | 7 | 8 | 9 | 10 |
| --- | --- | --- | --- | --- | --- | --- | --- | --- | --- | --- | --- |
| Tensile at break | [MPa] | 13.5 | 15.5 | 15.2 | 14.2 | 14.5 | 13.0 | 16.1 | 15.7 | 15.6 | 14.6 |
| Elongation | [%] | 520 | 485 | 465 | 470 | 470 | 430 | 540 | 490 | 535 | 495 |
| | | | Tension Set, RT, 10 mins. At 300%, 10 min. relaxation | | | | | | | | |
| | % | 7 | 15 | 28 | 10 | 19 | 1 | 5 | 25 | 1 | 17 |
| | | | Tension Set, 130° C., 72 H, 100%, 30 min. relaxation | | | | | | | | |
| | % | 35 | 41 | 45 | 33 | 37 | 10 | 18 | 33 | 16 | 21 |

Table VI reports injection transfer molding data for the ten formulations identified in Table IV. Each formulation was injection molded and the spiral flow, the weight of the polymer throughout (sample weight), and injection pressure for each formulation was recorded. Spiral flow values are reported in centimeters. The larger the value, the better the processability of the composition. The percent change of the values for the isobutylene-based polymer and PPU formulations from the corresponding comparative formulation were calculated and reported in Table VI.

TABLE VI

| | | Butyl 268 | | | | | EXXPRO ™ 3035 | | | |
| | | PPU 3 | | PPU 4 | | | PPU 3 | | PPU 4 | |
| Component | | 1 | 2 | 3 | 4 | 5 | 6 | 7 | 8 | 9 | 10 |
| --- | --- | --- | --- | --- | --- | --- | --- | --- | --- | --- | --- |
| | | Processability Evaluation on REP-injection molding machine Clamping pressure: 250 Bar, Extruder temperature: 100° C.; Pot temperature: 110° C.; Injection pressure: 250 Bar; Mould temperature: 200° C.; Injection Time: 20 sec.; Cure Time: Tc90x1.4; Shot Size: 240. | | | | | | | | | |
| Average Spiral | cm | 60.3 | 60.7 | 63.0 | 62.3 | 63.5 | 61.5 | 63.0 | 65.0 | 68.4 | 70.0 |
| | (+%) | | 0.6 | 4.5 | 3.3 | 5.3 | | 2.4 | 5.7 | 11.2 | 13.8 |
| Average weight | gr | 7.09 | 7.15 | 7.4 | 7.28 | 7.43 | 7.29 | 7.73 | 7.73 | 8.02 | 8.22 |
| | (+%) | | 0.8 | 4.4 | 2.7 | 4.8 | | 6 | 6 | 10 | 12.8 |
| Average pressure | Bar | 185 | 178 | 174 | 177 | 201 | 180 | 190 | 190 | 182 | 183 |

The data reported in Tables V and VI reveal that inclusion of polymers including propylene-derived units in the blends at levels of 10 parts by weight and 20 parts by weight based upon 100 parts per weight of the isobutylene-based polymers decreases Mooney viscosity, increases injection molding throughput, as measured by volume per unit of time, by up to approximately 10%, and decreases injection pressure. At the same time, cure properties such as scorch times improve, physical properties such as 100% modulus and tensile strength increase, while compression set is unchanged. The blends incorporating the isobutylene-based polymer and the polymer including propylene-derived units display a better balance of processability and properties compared to the isobutylene-based compositions of the comparative formulations.

The composition herein described can be formed into an article, by melting the composition to form a melted composition, forming the melted composition into a shape, and cooling the shape consolidate it into an article. Such molding and formation techniques as are known in the art may be used, non-limiting examples of which include, injection molding, roto-molding, extrusion, pultrusion, stamp molding, press molding, to name but a few.

All patents and publications referred to herein are hereby incorporated by reference in their entireties.

Although the present invention and its advantages have been described in detail, it should be understood that various changes, substitutions, and alterations could be made without departing from the spirit and scope of the invention as defined by the following claims.

We claim:

1. An injection molded pharmaceutical stopper comprising a composition consisting essentially of:
   (i) a first component comprising isobutylene-based polymer;
   (ii) about 5 parts to about 40 parts by weight, based on 100 parts by weight of the isobutylene-based polymer, of a second polymer component comprising propylene-derived units and optionally polyene-derived units, the second polymer component having a heat of fusion of from 7 J/g to 75 J/g and wherein the propylene-derived units have an isotactic triad fraction of 75% to 97%;
   (iii) about 2 parts to about 10 parts by weight of a non-functionalized plasticizer, based on 100 parts by weight of the isobutylene-based polymer, the non-functionalized plasticizer having a kinematic viscosity of 2 cSt or more at 100° C., and a flash point of at least 190° C.;
   (iv) from 1 to 60 wt %, by weight of the article, of a filler; and
   (v) curative agents and accelerators;

wherein the composition has a Mooney Viscosity (ML (1+4) at 100° C.) of 60 to 80 and a tensile strength of from 3.5 to 6.2 MPa.

2. The injection molded pharmaceutical stopper of claim 1, wherein the second component is a copolymer comprising in the range of about 75 wt. % to about 95 wt. % of propylene-derived units, and about 0.1 to about 25 wt. % polyene-derived units, based on the total weight of propylene-derived units and polyene-derived units.

3. The injection molded pharmaceutical stopper of claim 2, wherein the second component comprises at least 5 wt. % of comonomer units derived from, monomers other than propylene.

4. The injection molded pharmaceutical stopper of claim 3, wherein the comonomer units are ethylene-derived units and polyene-derived units.

5. The injection melded pharmaceutical stopper of claim 4, wherein the second component comprises from about 75 wt. % to about 95 wt. % propylene-derived units and from about 5 wt. % to about 25 wt. % polyene-derived units, based on the combined weight of the ethylene-derived units and polyene-derived units.

6. The injection molded pharmaceutical stopper of claim 1, wherein the second component comprises from about 5 parts to about 30 parts by weight of a polymer comprising propylene-derived units and polyene-derived units, based upon 100 parts by weight of the isobutylene-based polymer.

7. The injection molded pharmaceutical stopper of claim 1, wherein the second component comprises from about 10 parts to about 20 parts by weight of a polymer comprising propylene-derived units and polyene-derived units, based upon 100 parts by weight of the isobutylene-based polymer.

8. The injection molded pharmaceutical stopper of claim 1, wherein the polyene-derived units comprise a diene.

9. The injection molded pharmaceutical stopper of claim 1, wherein the second component comprises from about 0.1 wt. % to about 25 wt. % of the polyene-derived units.

10. The injection molded pharmaceutical stepper of claim 1, wherein the second component comprises from about 1 wt. % to about 12 wt. % of the polyene-derived units.

11. The injection molded pharmaceutical stopper of claim 1 wherein composition has a Shore A hardness of less than 65.

12. The injection melded pharmaceutical stopper of claim 11, wherein the isobutylene-based polymer is selected from the group consisting of butyl rubber, polyisobutylene, random copolymers of a $C_4$ to $C_7$ isomonoolefin, random copolymers of a para-alkylstyrene, and blends thereof.

13. The injection molded pharmaceutical stopper of claim 12, wherein the combined weights of the isobutylene-based polymer, the second component, and the non-functionalized plasticizer is of from about 50 wt. % to about 100 wt. %, based on the total weight of the polymeric composition.

14. The injection molded pharmaceutical stopper of claim 13, wherein the isobutylene-based polymer is halogenated.

15. The injection molded pharmaceutical stopper of claim 14, wherein the isobutylene-bused polymer is a brominated butyl rubber.

16. The injection molded pharmaceutical stopper of claim 15, wherein the second component comprises about 5 wt. % to about 20 wt. % ethylene-derived units, based on the combined weight of the ethylene-derived units and polyene-derived units.

17. The injection molded pharmaceutical stopper of claim 1, wherein the polyene-derived units are derived from 5-ethylidene-2-norbornene, 5-vinyl-2-norbornene, or divinyl benzene.

18. The injection molded pharmaceutical stopper of claim 1, wherein the polyene-derived units are derived from 5-ethylidene-2-norbornene.

19. The injection molded pharmaceutical stopper of claim 1, wherein the polyene-derived units are derived from 5-vinyl-2-norbornene.

20. The injection molded pharmaceutical stopper of claim 1, wherein the polyene-derived units are derived from divinyl benzene.

* * * * *